United States Patent Office 3,020,228
Patented Feb. 6, 1962

3,020,228
UPGRADING LUBRICATING OILS BY HYDROGENATION WITH A THREE COMPONENT CATALYST
Jacques Demeester, Paris, France, assignor to The British Petroleum Company Limited, London, England, a joint-stock corporation of Great Britain
No Drawing. Filed Apr. 27, 1959, Ser. No. 808,862
Claims priority, application France May 2, 1958
22 Claims. (Cl. 208—264)

This invention relates to the treatment of lubricating oils.

Catalytic reforming processes have made available to petroleum refineries considerable quantities of gases rich in hydrogen, thus rendering economically attractive methods of refining by means of hydrogen, in particular the refining hydrogenation of lubricating oil fractions, hereinafter referred to as hydrofinishing.

Applicant has studied the hydrofinishing of lubricating oils as a final treatment for these oils in place of the conventional treatment with clay. The object of this final treatment is to give the oil in the first place a satisfactory colour and appearance and in the second place a suitable heat and storage stability. As in the case of clay treatment, there should be no important change in the molecular structure of the oil, in particular there should be no appreciable drop in viscosity.

Numerous catalytic hydrogenation processes for lubricating oils are known; certain use conditions sufficiently severe to change the structure of the oil and produce a drop in viscosity. It is possible at this price to obtain a satisfactory colour and stability. In particular, at temperatures above 340° C., one can hydrogenate lubricating oils over a catalyst consisting of the oxides of cobalt and molybdenum on alumina, and this hydrogenation produces a suitable colour and stability with a more or less appreciable drop in viscosity.

If one wishes to avoid an appreciable drop in viscosity, it is necessary to work at temperatures below 340° C., and under this condition hydrogenation with conventional catalysts consisting of the oxides of cobalt and molybdenum on an alumina support easily gives the desired colour, but does not always give a sufficient stability. This difficulty is more apparent in the case of oils which have not been solvent refined and which usually need to be treated with sulphuric acid and clay. For present purposes, stability is expressed by the index of reversion, defined hereinafter for non solvent-refined oils, and by the B.A.M. oxidation test in the case of solvent-refined oils (I.P. Method No. 48).

Applicant has investigated the operating conditions and the catalysts capable of effecting hydrofinishing to produce oils of suitable colour which are also heat and storage stable, whether or not the oils have been previously solvent refined, and without appreciable modification of the molecular structure of the oils, that is to say without appreciable drop in viscosity.

The process has been studied particularly for the treatment of distillate oils from crude petroleums of paraffinic or mixed base, but can equally be applied to oils from other crude petroleums, bituminous shales and synthetic oils.

According to the invention, these oils are refined with hydrogen at temperatures between 150° and 340° C., preferably between 250° and 320° C., using a catalyst consisting of alumina and the oxides of molybdenum and iron, the oxides being supported on the alumina. The catalyst may also contain the oxide of cobalt.

The pressure may vary between 5 ats. and 70 ats., but in practise one will use a pressure corresponding to the pressure of the hydrogen-rich gases from catalytic reforming processes which may be at 20–30 ats. The hydrogen feed rate is also variable but low, being from 5 to 150 vols. per vol. of oil under normal conditions. A preferred value is 23 vols. per vol. of oil. The feed rate can vary from 0.5 to 6 vols. of oil per vol. of catalyst per hour, the higher values being suitable for solvent-refined oils.

The process according to the invention gives oils of satisfactory colour, but also produces oils of a stability very much superior to that obtained with the traditional catalyst, consisting of the oxides of molybdenum and cobalt, under the same operating conditions.

The catalyst consisting of alumina and the oxides of molybdenum and iron has the following preferred composition, in terms of the content of the oxides and the alumina individually as a percentage of the catalyst weight:

| | Percent |
|---|---|
| $MoO_3$ | 8 |
| $Fe_2O_3$ | 12 | the oxides being supported on the alumina, preferably gamma alumina, which forms the balance of the catalyst; but the proportions of the two oxides may vary as follows:

| | Percent |
|---|---|
| $MoO_3$ | 4–12 |
| $Fe_2O_3$ | 6–20 |

If the oxide of cobalt, CoO, is added to the oxides of molybdenum and iron, the preferred composition, measured in the same terms, is:

| | Percent |
|---|---|
| $MoO_3$ | 9 to 10 |
| $Fe_2O_3$ | 10 to 12 |
| $CoO$ | 2 to 5 | on the alumina support, preferably gamma alumina, which forms the balance of the composition.

One can vary the above values within the following limits:

| | Percent |
|---|---|
| $MoO_3$ | 3 to 20 |
| $Fe_2O_3$ | 4 to 20 |
| $CoO$ | 1 to 12 | in such a manner that the ratio by weight $MoO_3/CoO$ is about 3/1 and the content of $Fe_2O_3$ is as high as possible, compatible with the porosity of the catalyst support. In any case, the ratio $MoO_3/CoO$ should be above 2/1 when one uses 5% of $Fe_2O_3$ and above 1.5/1 when one uses 10% of $Fe_2O_3$.

In all cases the catalyst according to the invention can be sulphurised before using.

Applicant has also discovered that the method of preparation of the catalyst is an important factor in determining its activity.

In particular, catalysts prepared by the traditional method by coprecipitation of the alumina and of the salts of the metals of iron, molybdenum and cobalt, have an activity very much less than that obtained by the method of preparation according to the invention. The same applies to the method of impregnation of the freshly precipitated wet alumina gel with solutions of the above salts.

According to a further feature of the invention, catalysts consisting of alumina and the oxides of molybdenum, iron and, if desired, cobalt, the oxides being supported on the alumina, are prepared using granular alumina already calcined. The alumina is preferably an activated alumina obtained by the calcination of hydrargillite at above 500° C. The macrostructure of this alumina should be relatively loose in order to permit the impregnation therewith of a sufficient quantity of ferric nitrate solution which is a difficult matter.

By way of non-limiting example, a suitable alumina has pores of approximately 30 angstroms. Its active surface is 250 square metres per gramme and the volume of pores 35 cubic metres per 100 grammes.

The above alumina should first of all be impregnated with a solution of ferric nitrate, and the acidification of this solution favours impregnation. This acidification is preferably effected by means of nitric acid up to a pH in the neighbourhood of 0. The impregnation should be effected by soaking the alumina in the ferric nitrate solution or by wetting the alumina with the solution or by any other equivalent method.

The impregnation of the alumina is followed by drying at 110° C., then by calcination at 550° C.

The alumina already impregnated with the oxide of iron $Fe_2O_3$, is then impregnated with a solution of ammonium molybdate. The use of an ammoniacal solution of ammonium molybdate is necessary to facilitate impregnation of this salt and avoid its precipitation in contact with the alumina. One dries at 110° C. and calcines at 550° C. If it is desired to introduce cobalt into the catalyst, the impregnation with cobalt nitrate should be effected last, following the drying and calcination at 550° C. If desired, the calcination between the impregnation with the ammonium molybdate and with the cobalt nitrate may be dispensed with but the catalyst then runs the risk of being less homogeneous and less active.

A catalyst prepared according to the invention as described above is still not capable of giving the desired results. In order that it may give its full effect in the process according to the invention, it is necessary to submit it to a preliminary activation treatment which is most conveniently carried out in the hydrogenation reactor in which it will be used.

According to the invention, this activation treatment is effected by passing over the catalyst a mineral lubricating oil, preferably fluid and non-refined, under a pressure of hydrogen and at a temperature above or equal to 300° C. for a period of at least 24 hours. Satisfactory conditions would be, for example:

Temperature_____ 325° C.
Space velocity of oil per
  volume of catalyst_____ 1 vol./vol./hr.
Pressure_____ 20 atmospheres.
Feed rate of hydrogen_____ 20 vol. per vol. of oil per hour.
Duration_____ 48 hours.

While the temperature of at least 300° C. is a critical condition, the other conditions can be varied within large limits.

The invention will now be described by way of example with reference to the hydrofinishing of lubricating oil fractions from a Kuwait crude petroleum.

EXAMPLE I

*Hydrofinishing of a dewaxed but non-solvent-refined oil fraction*

The oil treated had the following properties.

Density, 15/15° C_____ 0.910
Viscosity in cs.:
  @ 37.8° C_____ 23.7
  @ 50° C_____ 14.6
Viscosity index_____ 47
Flashpoint, ° C_____ 200
Pour point, ° C_____ −24
Acid index (mg. KOH/gr.)_____ 0.22
Sulphur, percent wt_____ 2.9

This oil was hydrogenated under the following conditions:

Hydrogen pressure_____ 20 ats.
Hydrogen feed rate_____ 25 litres/litre of oil.
Space velocity_____ 1 vol./vol./hour.
Temperature_____ From 250–340° C. by increments of 25° C.

These conditions do not produce any appreciable drop in viscosity and the yield of oil is always very near 100%. The acid index of the hydrogenated oil is lowered to values of the order of 0.01.

For each treating temperature, the colour of the oil was measured as expressed by light absorption using a photocolorimeter Bonet-Maury through a Wratten screen No. 7. The stability was expressed by comparing the colour of a sample before and after artificial aging for 16 hours at 85° C. in the presence of air. The ratio between the light absorptions gives what one calls the "index of reversion" of the oil, an expression of its stability.

Index of reversion
$$= \frac{\text{Absorption of the artificially aged oil}}{\text{Absorption of the fresh oil}}$$

For each catalyst studied under the above conditions, one can plot by this method the graph of the index of reversion as a function of the hydrogenation temperature. The lowest index of reversion (i.e. the maximum stability) corresponding in each case to a temperature between 275 and 320° C., has been shown in Table 1 as well as the colour of the hydrogenated oil, expressed by its light absorption by the photocolorimeter.

Table 1 sets out the results obtained with catalysts of the same granular form based upon the same gamma alumina and comprising different proportions of the oxides of molybdenum, iron and cobalt.

The traditional catalysts consisting of the oxides of molybdenum and cobalt, give a maximum stability expressed by an index of reversion of 1.47 when the ratio $MoO_3/CoO$ is equal to 3/1 and with 20% total active oxides.

The catalysts consisting of the oxides of molybdenum and iron give a maximum stability expressed by an index of reversion of 1.38 with 20% total active oxides of which only 8% is $MoO_3$, which shows the considerable effect of $Fe_2O_3$ in place of CoO.

The catalysts consisting of the oxides of molybdenum, iron and cobalt give maximum stabilities always for a ratio of $MoO_3/CoO$ of about 3. The corresponding indices of reversion are lower according as the content of $Fe_2O_3$ is higher.

| Percent $Fe_2O_3$: | Index of reversion |
|---|---|
| 0 | 1.47 |
| 5 | 1.37 |
| 10 | 1.28 |

These figures illustrate the considerable effect of $Fe_2O_3$ on the stability of the oil.

TABLE 1.—HYDROFINISHING OF A SPINDLE OIL FROM KUWAIT CRUDE

|  | Percent wt. active oxides in the catalyst ||| Total percent active oxides | Ratio by wt. $MoO_3/CoO$ | Colour (light absorption) | Minimum index of reversion |
|---|---|---|---|---|---|---|---|
|  | $MoO_3$ | $Fe_2O_3$ | CoO |  |  |  |  |
| Catalyst MoCo, without $Fe_2O_3$ | 5 | 0 | 12 | 17 | 0.4 | 8.3 | 2.40 |
|  | 5 | 0 | 6 | 11 | 0.8 | 8.9 | 2.06 |
|  | 5.5 | 0 | 4.5 | 10 | 1.2 | 10.3 | 1.79 |
|  | 10 | 0 | 5 | 15 | 2 | 9.9 | 1.52 |
|  | 15 | 0 | 5 | 20 | 3 | 10.5 | 1.47 |
|  | 16 | 0 | 4 | 20 | 4 | 10.5 | 1.54 |
| Catalyst MoFe | 4 | 4 | — | 8 | — | 11.2 | 1.50 |
|  | 8 | 4 | — | 12 | — | 9.7 | 1.54 |
|  | 12 | 4 | — | 16 | — | 10.0 | 1.54 |
|  | 4 | 8 | — | 12 | — | 11.1 | 1.44 |
|  | 8 | 8 | — | 16 | — | 9.6 | 1.47 |
|  | 12 | 8 | — | 20 | — | 9.9 | 1.45 |
|  | 4 | 12 | — | 16 | — | 11.2 | 1.39 |
|  | 8 | 12 | — | 20 | — | 9.6 | 1.38 |
|  | 12 | 12 | — | 24 | — | 10.0 | 1.37 |
| Catalyst MoCo with 5% $Fe_2O_3$ | 5 | 5 | 12 | 22 | 0.4 | 9.3 | 1.66 |
|  | 5 | 5 | 6 | 16 | 0.8 | 8.4 | 1.55 |
|  | 10 | 5 | 6 | 21 | 1.7 | 7.8 | 1.45 |
|  | 12 | 5 | 5 | 22 | 2.4 | 9.5 | 1.38 |
|  | 15 | 5 | 5 | 25 | 3 | 10.2 | 1.37 |
|  | 18 | 5 | 5 | 28 | 3.6 | 11 | 1.38 |
|  | 20 | 5 | 5 | 30 | 4 | 11 | 1.40 |
| Catalyst MoCo with 10% $Fe_2O_3$ | 5 | 10 | 12 | 27 | 0.4 | 9.8 | 1.60 |
|  | 5 | 10 | 6 | 21 | 0.8 | 8.5 | 1.48 |
|  | 10 | 10 | 6 | 26 | 1.7 | 7.7 | 1.38 |
|  | 12 | 10 | 5 | 27 | 2.4 | 9.5 | 1.29 |
|  | 15 | 10 | 5 | 30 | 3 | 10.4 | 1.28 |
|  | 18 | 10 | 5 | 33 | 3.6 | 10.6 | 1.28 |
|  | 20 | 10 | 5 | 35 | 4 | 11 | 1.30 |

EXAMPLE II

*Hydrofinishing of a dewaxed and non-solvent-refined oil fraction*

The conditions of treatment were the same as in Example I, with a temperature of 310° C. Table 2, first part, gives the complete analysis of the initial oil, of the oil hydrogenated over the conventional molybdenum and cobalt oxides catalyst, of the oil hydrogenated over a molybdenum, iron and cobalt oxides catalyst, and also of the oil refined by means of sulphuric acid and clay.

One sees that the colours obtained are the same by the three treating processes, but the best index of reversion is that obtained with the molybdenum, iron and cobalt oxides catalyst which is only slightly inferior to that of the oil which had been subjected to the conventional treatment with sulphuric acid and clay.

The viscosity of the oil is practically unchanged and the acid index is practically nil.

EXAMPLE III

*Hydrofinishing of a viscous residual oil treated with furfural and dewaxed*

The conditions of treatment were the same as in Example I, except that the temperature was 310° C. Table 2, second part, gives the complete analysis of the initial oil, of the oil hydrogenated over the traditional molybdenum and cobalt oxides catalyst, of the oil hydrogenated over a molybdenum, iron and cobalt oxides catalyst, and also of the oil refined with clay.

The colour of the refined oil is best for the hydrogenating treatment, especialy with the molybdenum, iron and cobalt oxides catalyst. The stability is here expressed by the B.A.M. artificial ageing test (I.P. Method No. 48). This very severe test, which can only be used for the less volatile oils treated with selective solvents, shows that the best stability is obtained with the catalyst containing $Fe_2O_3$.

The drop in viscosity is very small and the yield of refined oil by hydrogenation is nearly 100%.

TABLE 2.—HYDROFINISHING OF KUWAIT LUBRICATING OILS

|  | Spindle oil (non-furfural refined) |||| Viscous residual oil (refined with furfural) |||| Methods used |
|---|---|---|---|---|---|---|---|---|---|
|  | Feedstock | Hydrogenated oil || Oil treated with acid 1%, clay 5% | Feedstock | Hydrogenated oil || Oil treated with 3% of clay |  |
|  |  | Catalyst Co-Mo[1] at 310° C. | Catalyst Fe-Co-Mo[2] at 310° C. |  |  | Catalyst Co-Mo[1] at 310° C. | Catalyst Fe-Co-Mo[2] at 310° C. |  |  |
| Specific Gravity 15/15° C | 0.910 | 0.909 | 0.909 | 0.910 | 0.905 | 0.904 | 0.904 | 0.902 | NFT 60.101. |
| Viscosity, centistokes at: |  |  |  |  |  |  |  |  |  |
| 37.8° C | 23.7 | 21.5 | 22.4 | 23.3 | 611.2 | 581.8 | 589.6 | 600.3 | IP. 71. |
| 50° C | 14.6 | 13.5 | 14.1 | 14.5 | 287.7 | 275.4 | 278.1 | 283.1 | IP. 71. |
| 99° C | 4.00 | 3.8 | 3.9 | 4.00 | 35.2 | 34.2 | 34.3 | 34.7 | IP. 71. |
| Index of Viscosity | 47.1 | 49.5 | 43.2 | 49.1 | 97.8 | 97.9 | 97.6 | 97.4 | IP. 73. |
| Flash Point, ° C | 200 | 197 | 197 | 202 | 286 | 284 | 286 | 291 | NFT 60.103. |
| Carbon Ramsbottom, percent | 0.12 | 0.11 | 0.10 | 0.10 | 0.45 | 0.43 | 0.43 | 0.45 | ASTM D.524. |
| Pour Point, ° C | −24 | −24 | −24 | −24 | −12 | −9 | −9 | −9 | ASTM D.97. |
| Acid Index (mg. KOH/gr.) | 0.225 | 0.011 | 0.011 | 0.070 | 0.004 | 0.004 | 0 | 0 | NFT 60.112. |
| Colour, NPA | 2½− | 1½− | 1½− | 1½+ | 3½ | 2½ | 2½− | 3½− | ASTM D.155. |
| Index of reversion |  | 1.8 | 1.3 | 1.4 |  | 1.2 | 1.1 | 1.1 | see text. |
| Sulphur content, percent wt | 2.9 | 2.4 | 2.3 | 2.9 | 1.7 | 1.6 | 1.5 | 1.7 | NFT 60.108. |
| B.A.M. oxidation test: |  |  |  |  |  |  |  |  | IP. 48. |
| Ramsbottom carbon increase |  |  |  |  | 1.04 | 0.60 | 0.52 | 0.76 |  |
| Viscosity ratio |  |  |  |  | 1.47 | 1.32 | 1.26 | 1.35 |  |

[1] Composition 14.1% $MoO_3$—2.9% CoO on alumina.
[2] Composition 10% $MoO_3$—5% CoO—10% $Fe_2O_3$ on alumina.

EXAMPLE IV

*Preparation of catalyst comprising the oxides of iron, molybdenum and cobalt on alumina ($Fe_2O_3$: 12%, $MoO_3$: 8.5%, CoO: 2.5%)*

The catalyst support is a granular alumina of 1 to 3 mm. obtained by the calcination of hydrargillite at 500° C. This alumina has pores of 30 angstroms and an active surface of 250 square metres per gramme. The volume of the pores is 35 cubic centimetres per 100 gr., which enables it to be impregnated easily with an appreciable quantity of ferric nitrate solution.

This alumina was first impregnated by soaking at ambient temperature in an acid solution of pH approximately 0 of 45% by weight ferric nitrate $(NO_3)_3Fe, 9H_2O$. The quantity of solution corresponds to an equal proportion by weight of nitrate of iron and alumina. Soaking was continued for 36 hours. The alumina was allowed to drain and then dried slowly below 100° C. then at 110° C. It was finally calcined at 550° C.

Impregnation with ammonium molybdate was then carried out by soaking at ambient temperature in an ammoniacal solution of ammonium molybdate containing 80 grammes per litre, with about twice the theoretical quantity of molybdate and for a period of 6 hours. The alumina was then allowed to drain, dried and calcined as above. The impregnation with cobalt nitrate was finally carried out by soaking at ambient temperature in a solution of cobalt nitrate containing 100 grammes per litre, with twice the theoretical quantity of cobalt for a period of 18 hours. The alumina was finally allowed to drain, dried and calcined as above.

The catalyst thus prepared had the following composition:

| | Percent |
|---|---|
| $Fe_2O_3$ | 11.8 |
| $MoO_3$ | 8.5 |
| CoO | 2.6 | on an alumina support.

The catalyst was then placed in service in a continuously operating hydrogenation reactor, while feeding a Kuwait spindle oil dewaxed only, under the following conditions:

| | |
|---|---|
| Temperature | 325° C. |
| Oil feed rate | 1 vol. per vol. of catalyst per hour. |
| Pressure | 20 atmospheres. |
| Hydrogen feed rate | 20 vol. per vol. of oil per hr. |
| Duration | 48 hours. |

After this activation treatment, the temperature was lowered to 275° C. and the treated oil then had a colour stability expressed by an index of reversion of 1.28.

The following are examples of preparing a catalyst of the same composition as in Example IV but by different methods from that according to the invention.

These catalysts were activated as in Example IV, by hydrogenation of the same spindle oil at 325° C. and the treatment of this oil was then carried out at 275° C. giving the stabilities expressed by the indices of reversion as follows.

| Method of preparation: | Index of reversion |
|---|---|
| Example V—Co-precipitation of the oxide of iron and of alumina from the nitrates. Drying—calcination—granulating. Impregnation with ammonium molybdate and cobalt nitrate—drying—calcination | 1.55 |
| Example VI—Agglomeration of a powder consisting of a mixture of activated alumina and of ammonium molybdate by means of a solution of the nitrates of iron and cobalt—drying—calcination | 1.70 |
| Example VII—Agglomeration of a powder of activated alumina by means of a solution of ferric nitrate. Impregnation with a solution of ammonium molybdate and cobalt nitrate—drying—calcination | 1.50 |
| Example VIII—Co-precipitation of the hydroxides of iron, cobalt and aluminum from the corresponding nitrates. Drying—calcination—granulation. Impregnation with a solution of ammonium molybdate—drying—calcination | 1.90 |
| Example IX—Impregnation of granular activated alumina with a solution of ammonium molybdate. Drying—impregnation with a solution of the nitrates of iron and cobalt—drying—calcination | 1.40 |
| Example X—Mixture of hydroxides of iron, cobalt, molybdenum and aluminum freshly precipitated and wet—drying—calcination—pelleting | 1.50 |

Lastly, the importance of the final activation of the catalyst prepared according to the invention is shown in the following example.

EXAMPLE XI

The same catalyst as in Example IV is placed in service in the same plant which operates under the same conditions and with the same feedstock, but from the beginning a temperature in the region of 275° C. was used, without having activated for 48 hours at 325° C. The oil thus treated had a colour stability expressed by an index of reversion of 1.6.

The iron-containing catalysts used in Examples I to III were prepared by the method described in Example IV.

I claim:

1. A process for refining a lubricating oil to produce an oil of improved stability, which comprises contacting the oil in the presence of hydrogen and at a temperature of between about 150° and 340° C. with a catalyst consisting of alumina and the oxides of molybdenum, iron, and cobalt; the oxides being supported on the alumina, and the ratio, by weight, of molybdenum oxide to cobalt oxide being at least equal to 1.5:1, the content of molybdenum oxide being between about 3 and 20% by weight of the total catalyst weight, and the minimum content of iron oxide being 10% of the total catalyst weight when said ratio is equal to 1.5:1, progressively less than 10% of the total catalyst weight as said ratio increases from 1.5:1 to 3:1, 4% of the total catalyst weight when said ratio is in the region of 3:1, and progressively more than 4% of the total catalyst weight as said ratio increases above 3:1.

2. A process according to claim 1, wherein said ratio of molybdenum oxide to cobalt oxide is 3:1.

3. A process according to claim 1, wherein the hydrogen pressure is from 5 to 70 ats., the hydrogen feed rate is from 5 to 150 vols. per vol. of oil treated, and the space velocity is from 0.5 to 6 vols. of oil per vol. of catalyst.

4. A process according to claim 1, wherein the hydrogen pressure is from 20 to 30 ats., the hydrogen feed rate is from 5 to 150 vols. per vol. of oil treated, and the space velocity is from 0.5 to 6 vols. of oil per vol. of catalyst.

5. A process according to claim 1, wherein the catalyst has the following composition of oxides in terms of the content of the oxides and the alumina as a percentage of the total catalyst weight:

| | Percent |
|---|---|
| $MoO_3$ | 3 to 20 |
| CoO | 1 to 12 |
| $Fe_2O_3$ | 4 to 20 |

6. A process according to claim 5, wherein the catalyst has the following composition of oxides in terms of the content of the oxides and the alumina as a percentage of the total catalyst weight:

| | Percent |
|---|---|
| $MoO_3$ | 9 to 10 |
| $CoO$ | 2 to 5 |
| $Fe_2O_3$ | 10 to 12 |

7. A process according to claim 1, wherein the catalyst has been activated, prior to contact with the oil to be refined, by contact in the presence of hydrogen with a mineral oil having a high sulphur content at a temperature of at least 300° C. for at least 24 hours.

8. A process according to claim 7 wherein said mineral oil having a high sulphur content is an extract obtained by the treatment of a mineral oil with a selective solvent.

9. A process for refining a lubricating oil to produce an oil of improved stability, which comprises contacting the oil in the presence of hydrogen and at a temperature of 150° to 340° C. with a catalyst consisting of alumina and the oxides of molybdenum and iron, the oxides being supported on the alumina, the total quantity of said oxides being at least 10% of the total catalyst weight, and the quantity of iron oxide being at least 6% of the total catalyst weight.

10. A process according to claim 9, wherein the quantity of iron oxide is at least equal to the quantity of molybdenum oxide.

11. A process according to claim 9, wherein the hydrogen pressure is from 5 to 70 ats., the hydrogen feed rate is from 50 to 150 vols. per vol. of oil treated, and the space velocity is from 0.5 to 6 vols. of oil per vol. of catalyst.

12. A process according to claim 9, wherein the hydrogen pressure is from 20 to 30 ats., the hydrogen feed rate is from 5 to 150 vols. per vol. of oil treated, and the space velocity is from 0.5 to 6 vols. of oil per vol. of catalyst.

13. A process according to claim 9, wherein the proportion of the oxide of molybdenum, $MoO_3$, varies from 4 to 12% of the total catalyst weight, and that of the oxide of iron, $Fe_2O_3$, varies from 6 to 20% of the total catalyst weight, the optimum composition being $MoO_3$, 8% of the total catalyst weight, $Fe_2O_3$, 12% of the total catalyst weight.

14. A process according to claim 9, wherein the catalyst has been activated, prior to contact with the oil to be refined, by contact in the presence of hydrogen with a mineral oil having a high sulphur content at a temperature of at least 300° C. for at least 24 hours.

15. A process according to claim 14, wherein said mineral oil having a high sulphur content is an extract obtained by the treatment of a mineral oil with a selective solvent.

16. A catalyst composition for use in the hydrogenating refining of lubricating oils, which consists of alumina and the oxides of molybdenum, iron and cobalt, the oxides being supported on the alumina, the ratio, by weight, of molybdenum oxide to cobalt oxide being at least equal to 1.5:1, the content of molybdenum oxide being between about 3 and 20% by weight of the total catalyst composition weight, and the minimum content of iron oxide being 10% of the total catalyst composition weight, when said ratio is equal to 1.5:1, progressively less than 10% of the total catalyst composition weight as said ratio increases from 1.5:1 to 3:1, at least 4% of the total catalyst composition weight when said ratio is in the region of 3:1, and progressively more than 4% of the total catalyst composition weight as said ratio increases above 3:1.

17. A catalyst composition according to claim 16, wherein said ratio of molybdenum oxide to cobalt oxide is 3:1.

18. A catalyst composition according to claim 16 having the following composition of oxides in terms of content of the oxides and the alumina as a percentage of the total catalyst weight:

| | Percent |
|---|---|
| $MoO_3$ | 3 to 20 |
| $CoO$ | 1 to 12 |
| $Fe_2O_3$ | 4 to 20 |

19. A catalyst composition according to claim 18 having the following composition of oxides in terms of content of the oxides and the alumina as a percentage of the total catalyst weight:

| | Percent |
|---|---|
| $MoO_3$ | 9 to 10 |
| $CoO$ | 2 to 5 |
| $Fe_2O_3$ | 10 to 12 |

20. A catalyst composition for use in the hydrogenating refining of lubricating oils, which consists of alumina and the oxides of molybdenum and iron, the oxides being supported on the alumina, the total quantity of said oxides being at least 10% of the total catalyst composition weight, and the quantity of iron oxide being at least 6% of the total catalyst composition weight.

21. A catalyst composition according to claim 20, wherein the quantity of iron oxide is at least equal to the quantity of molybdenum oxide.

22. A catalyst composition according to claim 20, wherein the quantity of the oxide of molybdenum, $MoO_3$, varies from 4 to 12% of the total catalyst composition weight, and that of the oxide of iron, $Fe_2O_3$, varies from 6 to 20% of the total catalyst composition weight, the optimum quantity of $MoO_3$ and $Fe_2O_3$ in the catalyst composition being $MoO_3$, 8% of the total catalyst composition weight, $Fe_2O_3$, 12% of the total catalyst composition weight.

References Cited in the file of this patent

UNITED STATES PATENTS

| 2,654,696 | La Porte | Oct. 6, 1953 |
| 2,739,132 | Riedl | Mar. 20, 1956 |
| 2,799,661 | De Rosset | July 16, 1957 |
| 2,880,171 | Flinn et al. | Mar. 31, 1959 |